United States Patent

[11] 3,627,307

| [72] | Inventor | Lucas van der Does<br>Delft, Netherlands |
|---|---|---|
| [21] | Appl. No. | 14,309 |
| [22] | Filed | Feb. 26, 1970 |
| [45] | Patented | Dec. 14, 1971 |
| [73] | Assignee | N. V. Optische Industrie de Oude Delft<br>Delft, Netherlands |

[54] FILM-CHANGING DEVICE
3 Claims, 4 Drawing Figs.

[52] U.S. Cl. ................................................. 271/3,
271/14, 271/19
[51] Int. Cl. ..................................................... B65h 5/10
[50] Field of Search .......................................... 271/14, 16,
3, 4, 19

[56] References Cited
UNITED STATES PATENTS

| 1,319,716 | 10/1919 | Linebaugh .................... | 271/14 |
| 2,031,572 | 2/1936 | Parker .......................... | 271/14 |
| 2,285,224 | 6/1942 | Nigra et al. ................... | 271/53 X |
| 2,745,664 | 5/1956 | Davies et al. ................. | 271/44 X |

*Primary Examiner*—Joseph Wegbreit
*Attorney*—Arthur B. Colvin

ABSTRACT: Film-changing device for a photographic camera using film sheets, in which separation of the uppermost sheet from a stack is facilitated by means of pinchers bulging up the forward edge of the sheet. To remove the sheet the bulged edge is clamped by a clip member mounted on a reciprocatable carriage and so pulled out of the supply magazine.

INVENTOR.
Lucas van der Does

INVENTOR.
Lucas van der Does

FILM-CHANGING DEVICE

The invention relates to a film-changing device for a photographic camera using individual film sheets.

Devices of this type generally comprise pinching means which, in order to facilitate the separation of the uppermost sheet from a stack of film sheets, act upon two side edges of the uppermost sheet so as to slightly bulge it upwards and thereby partly release it from the stack. Thereafter the rear edge of the bulged sheet is caught by a hooked arm which pushes it away from the stack at the discharge side of the supply magazine. The pinching means can be positioned either near the discharge end of the magazine or near the rear edge of the sheet. With the first-mentioned position the hooked arm is inserted between the stack and the bulged uppermost sheet and moved backwardly until the rear edge of that sheet can be caught by the hook. With the second position of the pinching means the hooked arm is moved over the uppermost sheet until its bulged rear edge can be caught by the hook.

These known devices have the common drawback that it is the rear edge of the sheet which is caught by the moving arm. This occasionally causes the film to become stuck in a slant position in its guides. Moreover, in devices of the type first mentioned the hook of the moving arm is likely to scratch the film surface. The second-mentioned type, on the other hand, has the additional drawback that in spite of the bulged rear edge the forward part of the sheet is still flat and may exert substantial friction on the underlying sheet when the first sheet is pushed from the stack. Therefore, precisely adjustable stopping means should be provided at the discharge side of the supply magazine in order to prevent the underlying sheet from being removed also.

It is an object of the invention to avoid these drawbacks. The invention starts from a device as described above, which comprises pinching means positioned near the discharge side of the supply magazine for pressing toward each other the two side edges of the uppermost sheet in order to bulge up its forward edge, and a carriage for removing this sheet. According to the invention this carriage is provided with means for clamping the uppermost sheet at its bulged forward edge to thereby pull it out of the supply magazine when the carriage is moved in the discharge direction.

The clamping means preferably has a backwardly narrowing slot for receiving the film sheet, and at least one spring-loaded lever for clamping the forward edge of the sheet in the slot until the lever is lifted by a ledge at the end of the film path. The carriage may further be provided with means which, after the exposure, engage the film sheet at the forward edge during a backward stroke of the carriage and thereby push it into a takeup magazine, which is positioned over the supply magazine.

The invention will now be described with reference to the accompanying drawings in which.

Figure 1:
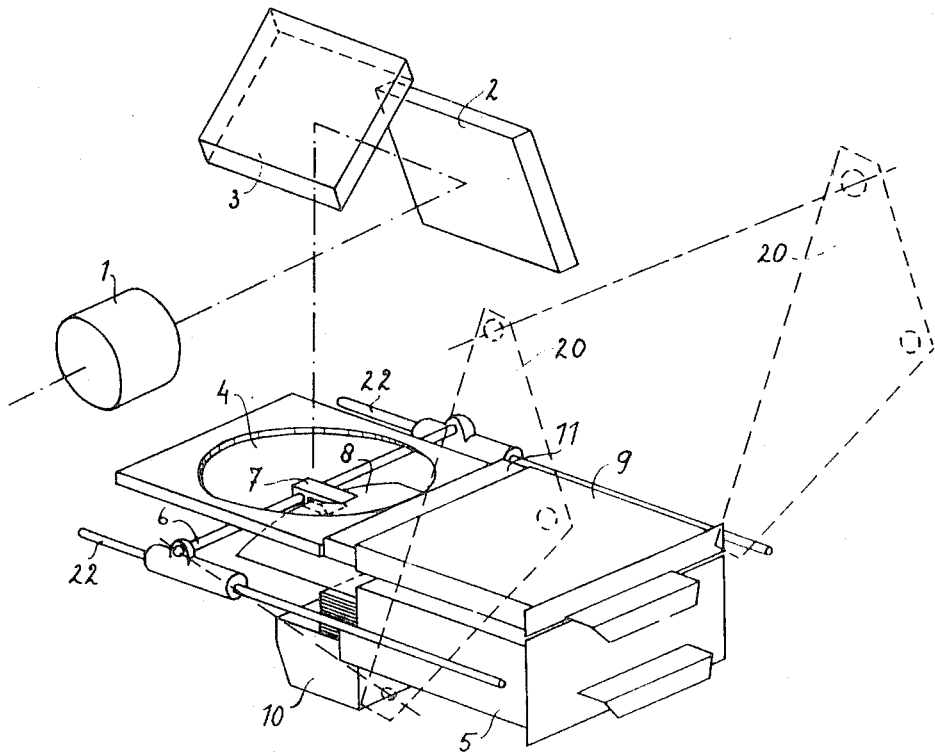
FIG. 1 shows the essential layout of a camera with a part of the film-changing device according to the invention.

The special camera schematically shown in FIG. 1 is provided with an objective 1 focusing an image in a circular exposure window 4 via two inclined flat mirrors 2 and 3. The lighttight camera housing is completely and the film-changing device partly omitted in order to show the basic construction. The unexposed photographic sheets are delivered from a supply magazine 5 and transported toward the exposure window 4 by a carriage 6, provided with a clip member 7 for clamping the film sheet 8. The carriage also takes care of the return movement of the exposed film sheet to the takeup magazine 9 mounted over the supply magazine 5. These magazines are inserted into the camera housing from the side. The magazine 5 is provided with a hinged cover 10, which is automatically opened at the end of the inward movement by means of a stop (not shown), so that the stack of film sheets comes withing reach of the film-changing means. The takeup magazine 9 is similar to a matchbox, turned upsidedown. Its inner box 11 is automatically pushed out slightly near the end of the inserting movement.

Figure 3:
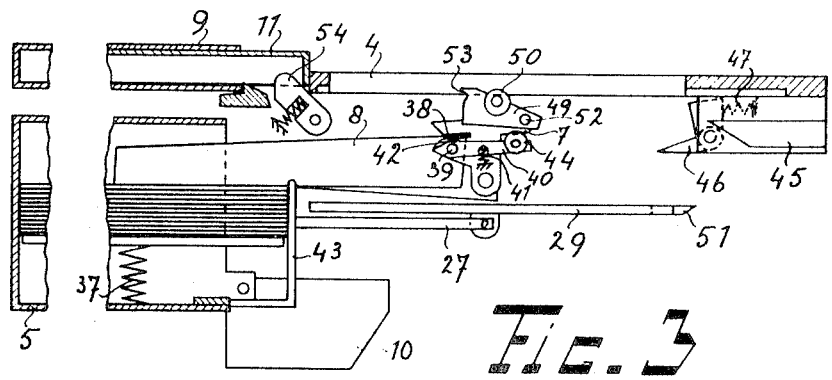
FIG. 3 shows a longitudinal section of a part of the device.
Figure 2:
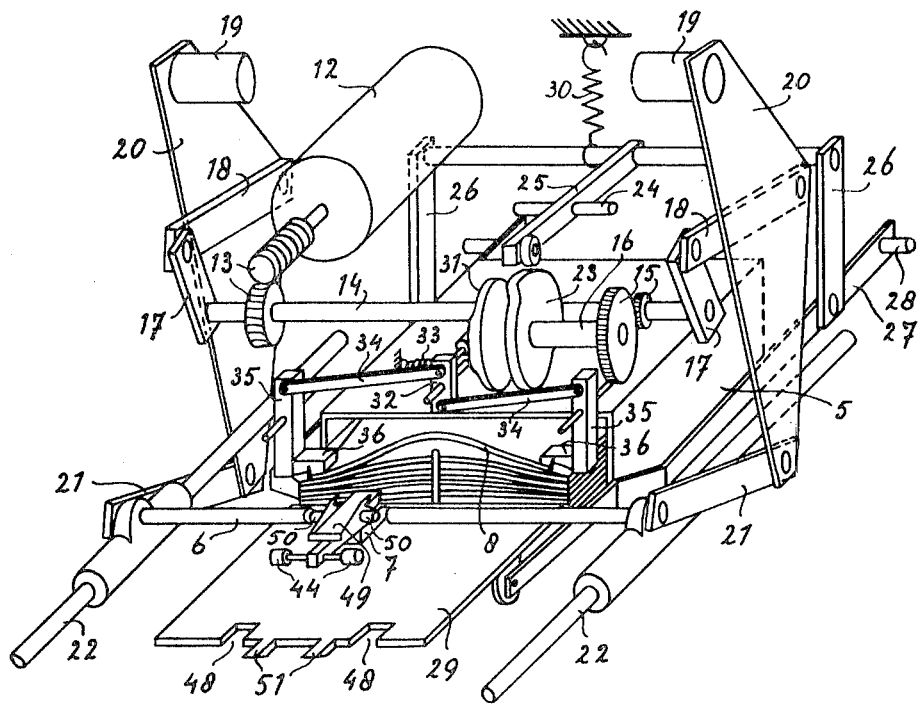
FIG. 2 shows a perspective view of the film-changing device.
Figure 4:
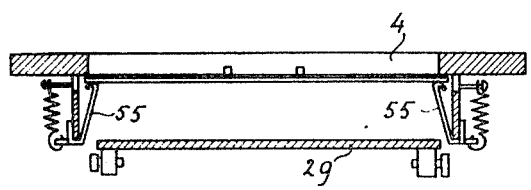
FIG. 4 shows a cross section of the exposure window.

In FIG. 2 all bearings and supporting parts and also some parts essential for the operation have been omitted for the sake of clarity. The latter parts are shown in FIGS. 3 and 4, however, so that the operation of the device will be described with reference to all these figures.

The complete film-changing device is driven by an electric motor 12. This motor drives via a worm gear 13 a shaft 14, whose speed of rotation is transmitted in a ratio 3:1 to a second shaft 16 by means of gear wheels 15. At the ends of shaft 14 cranks 17 are mounted which, in cooperation with rods 18, transform the rotation of shaft 14 to a swinging movement of levers 20, which are journaled at 19. The levers 20 are connected with the carriage 6 by driving rods 21 so as to cause a reciprocating movement of the carriage 6 on rods 22. On the shaft 16 two cams 23 and 31 are mounted of which the radial cam 23 controls the movement of the film-pressing plate 29 via a lever 25 journaled at 24, a yoke 26 and rods 27, which are rotatable about a shaft 28. The rods 27 support the film-pressing plate 29 in a position under the exposure window 4. One time during each revolution of cam 23 the plate 29 is lifted to the exposure window under the action of the spring 30 and lowered again after the exposure.

The exposure cam 31 is an axial cam which once during each revolution slightly urges the lever 32 to the left, against the action of the tension spring 33. This lever action is transformed to mutually opposite rotations of pinching means 35. These pinchers are each provided with a nose 36 against which the uppermost film sheet is held pressed. FIG. 3 shows that for this purpose the stack in the supply magazine is urged upwardly by a spring 37.

The noses 36 each have a small knife edge projecting from their base and having a height somewhat less than the thickness of the film sheet. When the pinchers are actuated these knife edges urge the sheet edges toward each other thus causing the sheet to bulge up (see FIG. 2). The film sheet is held in this position until the carriage 6 brings the clip 7 within reach of its forward edge.

As is particularly shown in FIG. 3, the clip has a backwardly narrowing slot 38 for receiving the film sheet 8. The incoming sheet urges a lever 40 journaled at 39 to slightly rotate clockwise contrary to the action of a small spring 41. By next moving the carriage 5 backwardly the sheet is clamped by a sharp nose 42 of lever 40 and pulled out of the supply magazine. The stack of sheets is secured against displacement by a stop 43.

The sheet is then brought into the space between the exposure window 4 and the pressing plate 29, which is now in the lowest position. At the end of the pulling motion the rollers 44 meet the beveled end of member 45, thus causing the nose 42 to release the sheet. Hereafter the forward edge of the sheet 8 touches tow crank levers 46 mounted on both sides of the track of the clip 7 and pushing the sheet out of slot 38. The released sheet is lifted toward the exposure window 4 by the rising pressing plate 29. The film sheet pushes the crank levers 46 aside and, after the passage of the sheet, these are turned back again under the action of springs 47, so that the horizontal arms of the levers are under the sheet now. FIG. 2 shows perforations 48 in the edge of the pressing plate, allowing passage to the crank levers 46. During the lifting of the pressing plate the sheet edges also activate in the same way further supporting levers 55 (see FIG. 4).

Now, with the film sheet in position for exposure, the carriage 6 makes one idle movement toward the magazine 5 and back. During this movement a lever 49 which is also mounted on clip member 7 and whose function will be described later, must be held out of contact with the lifted pressing plate. To that end this lever 49 is provided with two rollers 50 which, in cooperation with two beveled extensions 51 of the pressing plate 29, cause the lever 49 to turn anticlockwise about its bearing 52. During this idle movement of the carriage the clip 7 does not pick up the next sheet from the stack because the pinchers 35 have not been reactuated yet.

After the exposure the pressing plate 29 is lowered, so that the exposed sheet is only supported by levers 46 and 55. Since during the next stroke of the carriage the rollers 50 do not engage the pressing plate any longer, the noses 53 on lever 49 will meet the forward edge of the exposed sheet and push the same toward the magazines. During this movement the rear edge of the film sheet turns aside a spring-loaded lever 54 which is mounted under the entrance of the takeup magazine 9 and causes the exposed sheet to enter. Now the carriage 6 makes another reciprocating movement, during which the pinchers 35 are actuated as described herebefore in order to prepare the next sheet for removal from the stack.

What I claim is:

1. Film-changing device for a photographic camera using individual film sheets, comprising localized pinching means positioned near the discharge side of the supply magazine for pressing toward each other two side edges of the uppermost sheet of a stack of film sheets to thereby bulge up the forward edge of said film sheet, the rear edge of said sheet being substantially flat, and a carriage for removing said uppermost sheet, said carriage including means for clamping said uppermost sheet at its bulged forward edge to thereby pull the same out of the supply magazine during movement of the carriage in the discharge direction.

2. Film-changing device according to claim 1 wherein the clamping means has a backwardly narrowing slot for receiving the film sheet and at least one spring-loaded lever means for clamping the forward edge of the sheet in the slot, the device including ledge means positioned to engage and release said lever means from said clamping relation of said film responsive to movement of said clamping means to the end of said film path.

3. Film-changing device according to claim 2, wherein the carriage is provided with means which, after the exposure, engage the film sheet at the forward edge during a backward stroke of the carriage and thereby push it into a takeup magazine positioned over the supply magazine.

* * * * *